United States Patent [19]
Burke et al.

[11] Patent Number: 5,790,533
[45] Date of Patent: Aug. 4, 1998

[54] METHOD AND APPARATUS FOR ADAPTIVE RF POWER CONTROL OF CABLE ACCESS UNITS

[75] Inventors: Timothy M. Burke, Algonquin; Michael Mannette, Bloomingdale; Emanuel G. Owoye, Arlington Heights; Kurt Steinbrenner, Bartlett; Rich Corrigan, LaGrange, all of Ill.

[73] Assignee: Motorola, Inc., Schaumburg, Ill.

[21] Appl. No.: 548,972

[22] Filed: Oct. 27, 1995

[51] Int. Cl.⁶ .................................................. H04B 1/00
[52] U.S. Cl. .................. 370/318; 370/465; 455/38.3; 455/69
[58] Field of Search .................... 370/95.3, 465, 370/485, 336, 337, 343, 345, 330, 318, 386; 455/3.3, 6.1, 14, 68, 69, 70, 38.3, 13.4

[56] References Cited

U.S. PATENT DOCUMENTS

| | | | |
|---|---|---|---|
| 4,613,990 | 9/1986 | Halpern | 455/69 |
| 4,777,653 | 10/1988 | Bonnerot et al. | 455/69 |
| 4,811,421 | 3/1989 | Havel et al. | 455/69 |
| 4,905,235 | 2/1990 | Saburi | 370/95.3 |
| 4,910,732 | 3/1990 | Takahata et al. | 455/10 |
| 4,912,721 | 3/1990 | Pidgeon, Jr. et al. | 375/200 |
| 5,225,902 | 7/1993 | McMullan, Jr. | 455/6.1 |
| 5,255,086 | 10/1993 | McMullan, Jr. et al. | 455/6.1 |
| 5,257,283 | 10/1993 | Gilhousen et al. | 455/69 |
| 5,265,119 | 11/1993 | Gilhousen et al. | 455/69 |
| 5,289,459 | 2/1994 | Brownlie | 455/69 |
| 5,333,175 | 7/1994 | Ariyavisitakul et al. | 455/69 |
| 5,357,513 | 10/1994 | Kay et al. | 370/95.3 |
| 5,465,399 | 11/1995 | Oberholtzer et al. | 455/69 |

OTHER PUBLICATIONS

Personal Access Communications System Air Interface Standard J-STD-014 (Foreword and Section 6.6).
Generic Criteria for Version 0.1 Wireless Access Communications Systems (WACS), Bellcore, Issue 1, Oct. 1993, (Cover pages i-v, pp. 213-219).

*Primary Examiner*—Alpus H. Hsu
*Assistant Examiner*—Kwang Bin Yao
*Attorney, Agent, or Firm*—Jordan C. Powell; Charles D. Gavrilovich, Jr.

[57] ABSTRACT

A method and apparatus for controlling data transmissions from a first communications unit (202) to a second communications unit (210). Data transmissions received from the first communications unit (202) at the second communications unit (210) are processed to determine a power level of the data transmission. In response to a determination that the power level is not within a desired range or operating window (400), an adjustment value indicating the amount of change needed in the power level of the data transmission from the first communications unit (202) to fall within the desired range or operating window (400) is determined. This adjustment value is sent to the first communications unit (202). In response to receiving an adjustment value from the second communications unit (210), the first communications unit (202) adjusts the power level of its data transmissions. The first communications unit (202) and second communications unit (210) form a closed loop system providing for automatic gain control of the power level of data transmissions from the first communications unit (202).

29 Claims, 9 Drawing Sheets

METHOD AND APPARATUS FOR ADAPTIVE RF POWER CONTROL OF CABLE ACCESS UNITS

BACKGROUND OF THE INVENTION

1. Technical Field

The present invention relates generally to communication systems and in particular, to a method and apparatus for adaptive RF power control in a communications system. Still more particularly, the present invention relates to a method and apparatus for adaptive RF power control of data transmissions from a device attached to a communications systems.

2. Description of the Related Art

In a hybrid fiber/coaxial (HFC) telephony system, the upstream path leading from customer premises equipment to the headend is contaminated by variable levels of ingress noise. Additionally, node-to-node gain variations exist because of variations in tap losses and upstream amplifier gain settings. The consequence of these factors is transmitted radio frequency (RF) signals from customer premises equipment fluctuate within the dynamic range of the headend receiver. These fluctuations in the RF signals limit the effect of signal to noise ratio (SNR) of the received signals at the headend receiver, limiting performance of the system. n particular, although customer premises equipment may transmit signals back to a receiver at the headend on the same frequency but in different time slots, the power levels of the signals from the customer premises equipment may vary from each other by as much as 20 dB.

This difference in the power level of the signals occurs because of different tap losses and different gain settings of upstream amplifiers in the upstream fiber link in the fiber optic link. The resulting differences in power level for signals received at the headend receiver from different customer premises equipment results in signals from some customer premises equipment having marginal or poor performance because of a signal power level that is too close to the ingress noise power level at the headend receiver. Therefore, it would be advantageous to have a method and apparatus for reducing the effects of variable levels of ingress noise on transmitted signals in a cable communications system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
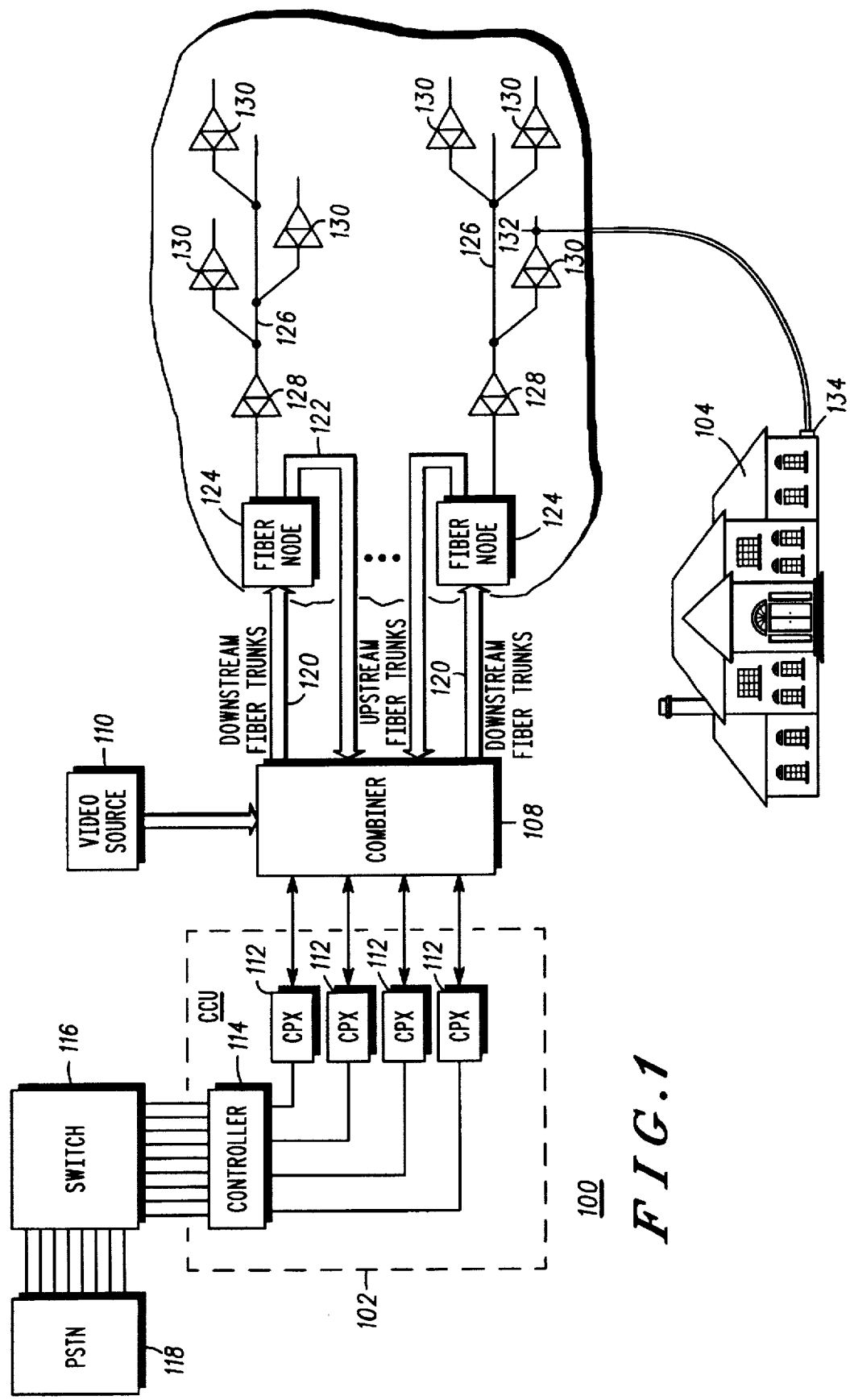
FIG. 1 is a diagram of a communications system in which the present invention may be implemented.

With reference now to the FIGS., and in particular with reference to FIG. 1, a diagram of a communications system is illustrated in which the present invention may be implemented. Communications system 100 is an example of a basic cable system architecture that is a hybrid cable system using a combination of fiber and coaxial cable to distribute subscriber services to customer premises equipment. Alternatively, communications system 100 may consist entirely of coaxial cable. Regardless of the cable infrastructure, a cable branch will serve a distribution area shared by a community of subscribers. Communications system 100 includes a cable control unit (CCU) 102 that is connected to subscriber 104 by a distribution network 106 and a combiner 108. Only a single subscriber 104 is shown for illustration purposes. Combiner 108 has an input for video sources 110. CCU 102 also includes cable port transceivers (CPXs) 112, which are connected to combiner 108. These cable port transceivers generate downstream carrier channels in communications system 100. Combiner 108 receives modulated RF carriers from video sources 110 and from CPXs 112 in CCU 102 and sums these signals together to be sent over distribution network 106. CPXs 112 are controlled by a controller 114, which provides all functions necessary to support the data link portion of the system. The headend typically includes CCU 102, combiner 108, and video sources 110. Digital switch 116 may be in a remote location from the headend or may be located at the headend itself. These components are the headend equipment responsible for providing access and management of services to a cable branch in communications system 100. Controller 114 in CCU 102 is connected to switch 116 through digital carrier facilities, such as T1 or E1, which is in turn connected to a public switching telephone network (PSTN) 118. Switch 116 may be, for example, a class 5 TELCO switch.

Transmissions from CCU 102 in distribution network 106 are facilitated by downstream fiber trunks 120 and upstream fiber trunks 122. These fiber trunks are fiber optic cables and are connected to fiber nodes 124. Fiber nodes 124 perform directional conversion between the optical domain of fiber optical cable and the electrical domain of coaxial cable in distribution network 106. Each fiber node 124 has a connection to at least one cable branch 126. In the depicted example, cable branch 126 is comprised of coaxial cable and includes trunk amplifiers 128, which are bi-directional amplifiers in the depicted example. Additionally, bi-directional line extenders 130 are located near tap 132, which is connected to a cable access unit (CAU) 134 located at subscriber 104. Data carried across distribution network 106 may include both voice and non-voice data, such as ISDN digital video, phone data, interactive video, or interactive multimedia services. In the present invention, the transport technology used for the cable telephony exchange service is trunked. In other words, a cable telephony traffic channel is not dedicated to one particular user, but is available to all users on the basis of a request for service. Such an arrangement is called multiple access or subscriber loop concentration.

Typically, once a particular channel is assigned to a subscriber, it is assigned for the duration of a call. When the call is terminated, the temporary assignment to the subscriber is revoked and the channel is made available for a subsequent service request. Consequently, it is possible for a cable branch to serve many more subscribers than the channels available in a cable branch. Additionally, the spectrum allocated for the CCU may be used for a different group of subscribers in every branch of the cable network.

According to the present invention, the cable telephony system divides up the radio frequency spectrum for use with multiple subscribers such that no individual subscriber has a dedicated frequency range. Cable access units, such as CAU 134, scan the downstream to acquire frame synchronization with the system broadcast channel (SBC). The SBC occupies a time slot in one of the carriers in each branch of the cable system. Frame synchronization is acquired by means of a digital correlation. The system access channel (SAC) and the traffic channel (TC) also are used in time slots. SACs are used for requesting access to the network and channel assignments are made on TCs.

Within a dedicated structure of spectrum allocation, a number of RF carriers are deployed, for frequency division multiplexing. In the depicted example, the RF carriers are spaced 600 KHz apart and each carries 8 digitally coded time division multiplex (TDM) information bearing channels. Each channel is divided by time into frames and slots. Active carriers are operated in pairs with one in the upstream segment of the allocation associated with each one in the downstream segment. This provides for a frequency division duplex duration period.

The communications system of FIG. 1 includes a SBC. A downlink SBC carries system wide information such as alerts, which are used to "page" a CAU, and system database information used for controlling and managing the cable interface in the communications system. The system information carried by the SBC includes information such as general system identifiers and capabilities, protocol timers and parameters, and location of carrier frequencies, other SBCs, and SACs. An uplink SAC provides a SAC, which is multiplexed into two logical sub-channels—a time alignment channel used to perform TDMA time alignment procedures and a request access channel used to request traffic channels of various bandwidths. A downlink SAC, also called a system response channel, is used for sending confirmations and responses to time alignment and system access requests. The communications system also includes TCs which are requested and assigned for varying rates of user information transfers.

Figure 2:
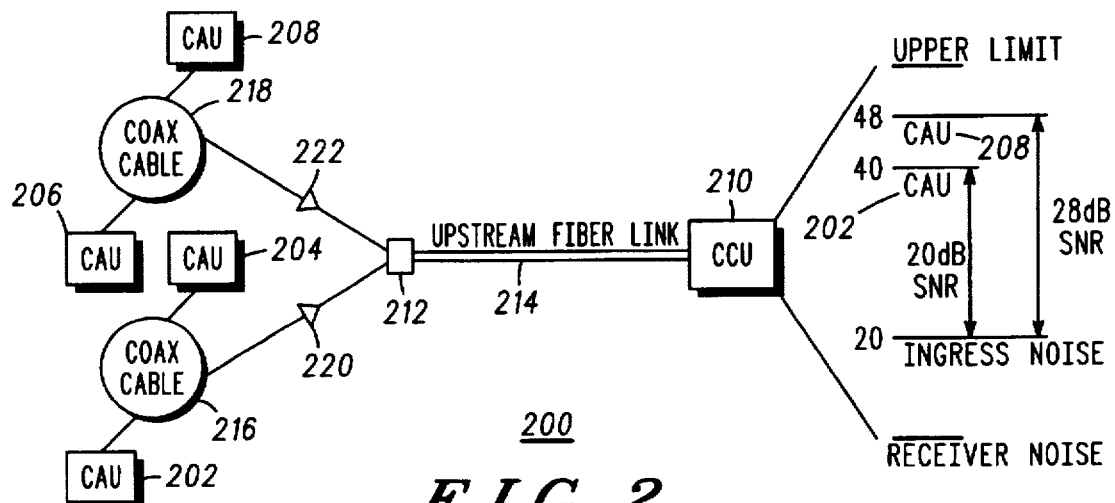
FIG. 2 is an upstream path in the communications system illustrated in FIG. 1.

In FIG. 2, an upstream path 200 in communications system 100 is illustrated. Upstream path 200 includes CAUs 202, 204, 206, and 208. These CAUs are connected to CCU 210 at the headend of upstream path 200 by fiber node 212 and upstream link 214. Upstream path 200 also includes coaxial cable 216 and 218, and upstream amplifiers 220 and 222, which are part of a cable branch in communications system 100.

In the depicted example, both CAUs 202 and 208 transmit at the same RF signal power level of 50 dBmV on the same frequency but in different time slots using time division multiple access (TDMA), which is a known technique for sharing one part of a channel among several users by splitting the channel into time slots. All signals in upstream path 200 incur a 30 dB loss in upstream fiber link 214 and a 40 dB gain at CCU 210. In the depicted example, the ingress noise power level into the CCU 210 (which is typically caused by noise entering the cable system at the subscriber premises) is −20 dBmV. When gain is applied by CCU 210 this results in a noise power level of 20 dBmV at the output of CCU 210. Therefore, the SNR of CAU 202 and CAU 208 are 28 dB and 20 dB respectively. This difference results from different losses and gains in upstream path 200. In particular, CAU 202 is connected to coaxial cable 216, which has a loss of 30 dB. Additionally, the signal from CAU 202 is amplified by upstream amplifier 220 which has an 18 dB gain. By comparison, the signal from CAU 208 has a 35 dB loss from coaxial cable 218, and a 15 dB gain from upstream amplifier 222. Losses and gains in signal power vary over time depending on various factors, such as, component tolerances and temperature.

In the depicted example, a 20 dB SNR level is required for acceptable levels of bit error performance. The SNR of CAU 208 is therefore marginal and may result in unacceptable performance. Ideally, the signal levels of all CAUs would be received at the highest level (upper limit in diagram) to maximize the received SNR. According to the present invention, the power level at which CAUs 202-208 transmit signals back to CCU 210 are dynamically controlled between CAUs 202-208 and CCU 210 to maintain the SNR of all CAUs operating on the same receiver at a maximum level and to minimize the effect of variable losses and gains occurring within the communications network.

Figure 3:
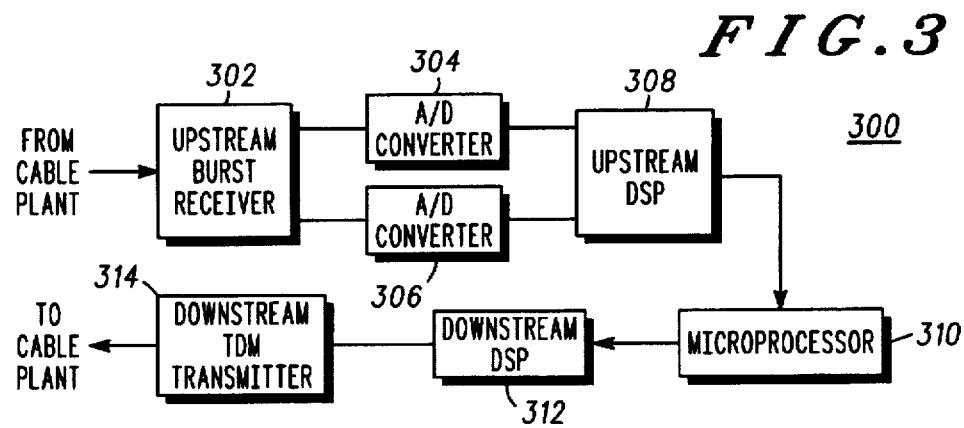
FIG. 3 is a block diagram of components in a cable control unit used to control RF power output from a cable access unit according to the present invention.

Turning next to FIG. 3, a block diagram of components in a CCU control unit used to control RF power output from a CAU is depicted according to the present invention. The CAU is designed to provide a variable level of RF power output from a minimum of 24 dBmV up to a maximum of 55 dBmV in increments of 2 dB in the depicted example. The output power of an individual CAU is controlled by the components depicted in FIG. 3.

More specifically, in CCU 300, upstream burst receiver 302 receives a TDMA burst from a CAU and down converts the burst to baseband quadrature I and Q signals. A "burst" is a fixed transmission of data in bits bearing information. The burst is π/4—DQPSK modulated. These baseband I and Q signals are converted to a digital signal by analog to digital (A/D) converters 304 and 306 and processed by upstream digital signal processor (DSP) 308. In the depicted example, A/D converters 304 and 306 are 8-bit A/D converters. Upstream DSP 308 provides a power level value, also called a "burst attenuation level", for the received burst and sends this value to microprocessor 310. This burst attenuation level is reported by upstream DSP 308 to microprocessor 310 on every received time slot.

If a burst is present in the time slot, then the burst attenuation level represents the power level of the burst. If no burst is present, then the burst attenuation level represents the amount of noise power on the received channel. Microprocessor 310 compares the reported burst attenuation level from upstream DSP 308 with desired operating levels to control the RF power output level of the CAU. If adjustments are necessary, microprocessor 310 sends a message back to the CAU through downstream DSP 312 and downstream TDM transmitter 314, which is connected to the communications network of which the CAU is located.

Upstream burst receiver 302, A/D converters 304 and 306, upstream DSP 308, microprocessor 310, downstream DSP 312, and downstream transmitter 314 are components found in CPXs 112 in FIG. 1. The downstream components depicted in FIG. 3 may be in the same transceiver or a different transceiver from the upstream components illustrated. Upstream DSP 308, microprocessor 310, and downstream DSP 312 make up a processing unit in FIG. 3. Although the power output level is determined in upstream DSP 308 in the depicted example, this determination could also be made within microprocessor 310 according to the present invention.

Figure 4:
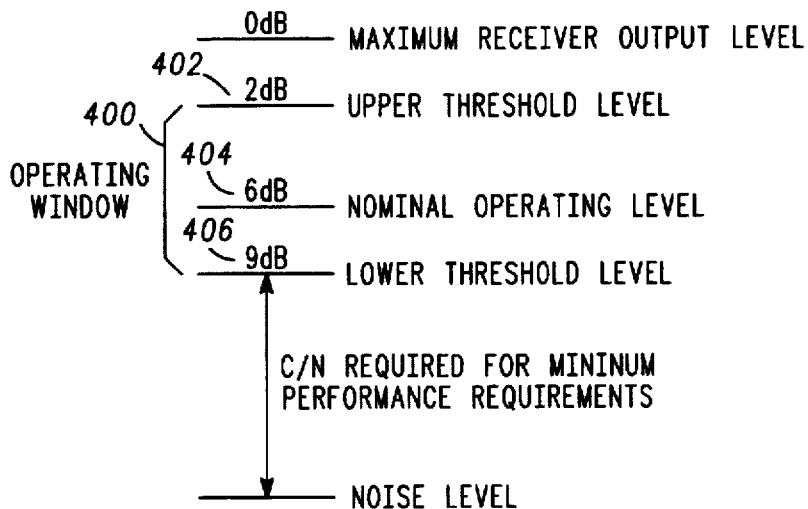
FIG. 4 is a diagram of an example of an operating window representing a desired operating level for received bursts from a cable access unit according to the present invention.

With reference to FIG. 4, a diagram of an example of an operating window 400 representing a desired operating level for received bursts from a CAU is depicted according to the present invention. As can be seen, the lower threshold level is 9 dB lower than the maximum receiver level with a nominal operating level at 6 dB lower than the maximum receiver level. The upper threshold level for operation is 2 dB below the maximum receiver level, with the maximum receiver level being 0 dB. 0 dB represents the power level of a received burst from a CAU at the CAU's maximum level.

Figure 5:
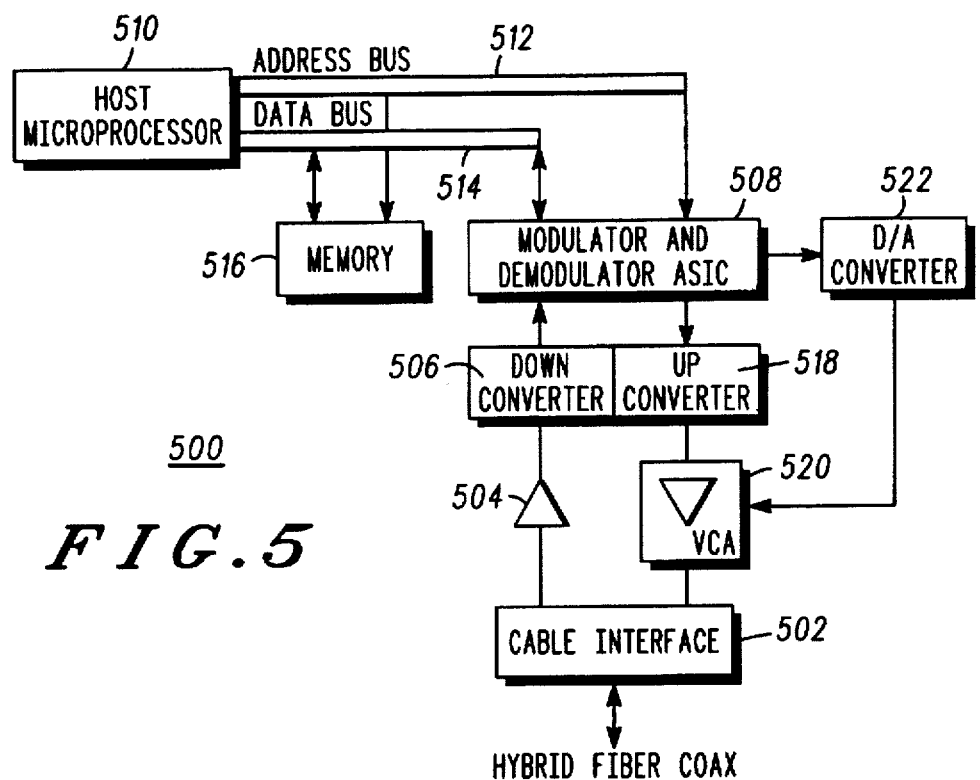
FIG. 5 is a block diagram of components in a cable access unit used for power control according to the present invention.

With reference now to FIG. 5, a block diagram of components in a CAU used for power control is depicted according to the present invention. CAU 500 is connected to hybrid coaxial cable by cable interface 502. Signals transmitted to CAU 500 are conditioned by buffer 504. Thereafter, the signals are processed by down converter 506 and sent to modulator and demodulator ASIC 508.

The demodulated information is received by host microprocessor 510 from modulator and demodulator ASIC 508 via address bus 512 and data bus 514. Data is stored in memory 516 along with instructions executable by host microprocessor 510. Memory 516 may include random access memory along with read only memory. Instructions for power control of signal transmissions in CAU 500 may be stored in random access memory or in read only memory.

Host microprocessor 510 sends messages from CAU 500 through address bus 512 and data bus 514 to modulator and demodulator ASIC 508. The messages are sent to up converter 518 and the outgoing signal is amplified by voltage controlled amplifier 520. The output of voltage controlled amplifier 520 is connected to cable interface 502 for transmission on hybrid fiber coaxial cable. Voltage controlled amplifier 520 is controlled by digital to analog (D/A) converter 522, which stores a value sent to it by host microprocessor 510, via modulator and demodulator ASIC 508. This value is converted by D/A convertor 522 into a voltage signal, which is used to control voltage controlled amplifier 520.

Controlling the power level of transmissions by CAU 500 in FIG. 5 is performed through a closed-loop system involving the receiver at the headend illustrated in FIG. 3. This system provides automatic gain control of the CAU. Microprocessor 310 in FIG. 3 receives the burst attenuation level of the CAU burst from upstream DSP 308 and uses signaling messages back to CAU 500 to adjust the power level. This system maintains the CAU burst receive level at the CCU within an operating window defined by upper threshold level 402, nominal threshold level 404, and lower threshold level 406 as depicted in FIG. 4. If the received burst attenuation level is lower than 2 dB (the upper threshold level 402), then the received burst level is too high and microprocessor 310 will signal CAU 500 to lower the power level of its signal transmitted to the receiver in the CCU. If the received attenuation level is greater than 9 dB (the lower threshold level 406), then the received burst level is too low and microprocessor 310 will signal CAU 500 to increase the power level of its signals transmitted to the CCU.

Increases and decreases in the power level of transmissions from CAU 500 are controlled by host microprocessor 510, which sends commands to modulator and demodulator ASCI 508 to increase or decrease the power level of the transmission by adjusting voltage controlled amplifier 520 through D/A converter 522. This signaling occurs between the CCU and the CAU until a nominal operating level is obtained at the receiver in the CCU.

In the depicted example, the upper threshold level is established to prevent the CAU from over-driving the receiver and clipping the I and Q wave forms at the A/D converters. If clipping occurs in the A/D convertors as a result of too much power being received, then the power level detector will indicate a received level between the maximum receiver output level (0 dB) and the upper threshold level (2 dB) as indicated in FIG. 4. The lower threshold level is established to maintain the maximum SNR within the dynamic range of the receiver with some level of hysteresis. The operating window, such as operating window 400 in FIG. 4, represents the amount of anticipated variations in the cable plant due to environmental effects. Providing hysteresis on the power level of the signals transmitted minimizes microprocessor resources and signaling required to effect level changes in the CAU.

The CAUs operate on one of three logical and/or physical signaling channels. During idle mode, the cable access unit listens to the SBC. This SBC is used to convey system information to all CAUs within a service area and to provide selective alerting of incoming calls to the CAUs. The SACs (the locations of which are conveyed on the SBC) are used by the CAUs to obtain service. TCs are used between the CAUs and the network to transport data, which may contain voice and non-voice data.

When a CAU receives a call or originates a call, it moves to the SAC to request one or more time slots depending on the type of service. The cable control unit then assigns a TC to the CAU. The CAU then moves to the assigned traffic channel and the connection is established.

Figure 6:
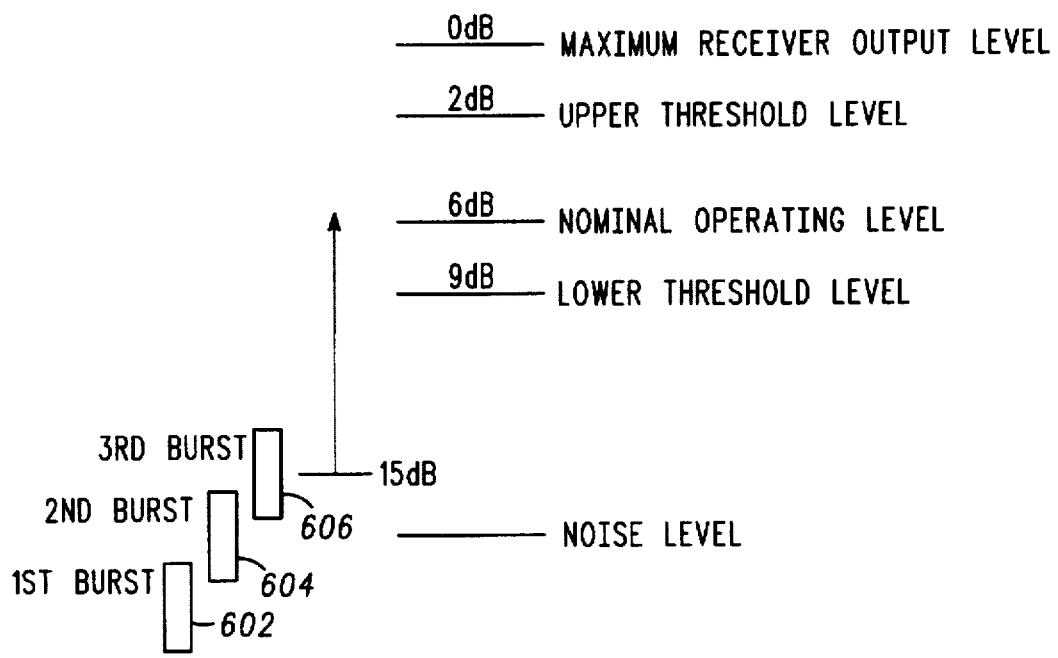
FIG. 6 is a diagram of changes in the power level of bursts from a cable access unit in establishing initial power level adjustment.

RF power control differs on the SACs and the TCs. When moving to a SAC, the CAU transmits a burst known as a "shortened burst". This shortened burst is used to establish TDMA time alignment and the initial power level adjustment. As can be seen with reference to FIG. 6, a diagram of changes in the power level of bursts from a CAU in establishing initial power level adjustment is depicted. Burst 602 is the first burst, burst 604 is the second burst, and burst 606 is the third burst in a series of bursts used to establish TDMA alignment and initial power level adjustment.

Initially on power up, the CAU transmits burst 602, a shortened burst at the lowest possible RF power level. This level received at the receiver in the CCU is too low to correctly decode. As a result, no message is sent back to the CAU. After a time period without receiving a response, the CAU increments the power level by 2 dB and transmits burst 604.

This process continues until the CCU correctly decodes the shortened burst and compares the power attenuation level from the CAU with the nominal operating level. A signed difference, in this case +9 dB, is sent in the response message from the CCU back to the CAU, as an adjustment value. In the depicted example, the CAU makes adjustments in 2 dB increments. As a result, the actual message sent from the CCU would be rounded up to 10 dB so that the CAU would increase its power by 10 dB.

The adjusted power level of the CAU takes place on the next transmitted burst. From that point on, the CAU transmits at the new power level until instructed otherwise by the CCU. Once the CAU moves over to the TC, the bursts are maintained within the operating window with the CCU performing a power level test every eight frames so that any power adjustments to the CAU will occur no sooner than eight frame periods, according to the present invention. This periodic testing and adjustment is made to allow time for adjustments to be made at the CAU and the effect of the adjustment to be measured at the receiver. Otherwise, oscillations may occur if adequate time is not provided to determine the results of the adjustment before sending out a message to re-adjust the power level at the CAU.

Figure 7:
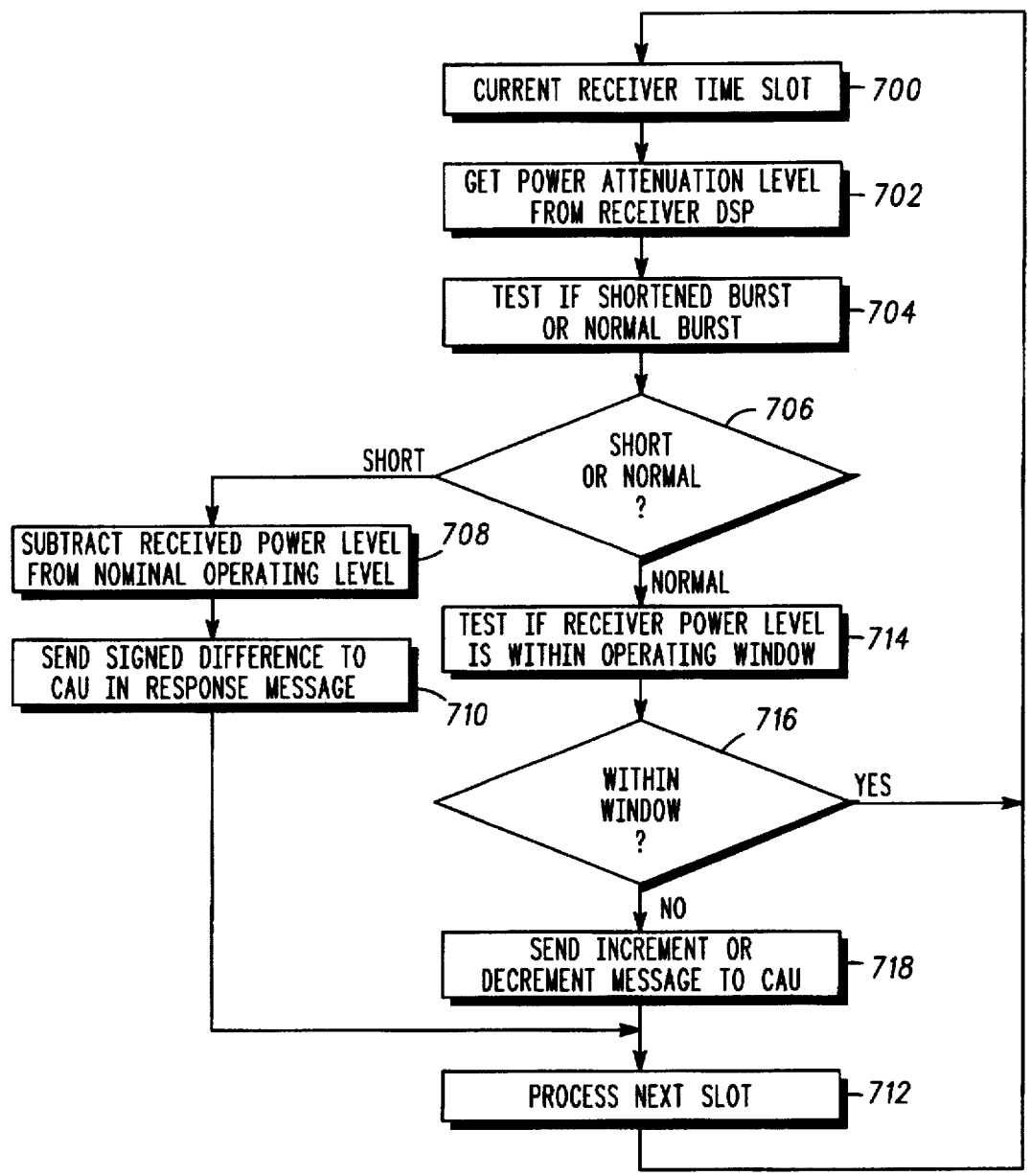
FIG. 7 is a flowchart of a process for controlling the power level of data transmissions at the cable control unit according to the present invention.

With reference now to FIG. 7, a flowchart of a process for controlling the power level of data transmissions at the cable control unit is depicted according to the present invention. The process begins by receiving the current time slot (step 700). Next, the power attenuation level is obtained from the receiver DSP (step 702). A test is then conducted to determine whether the message received in the time slot is a shortened burst or a normal burst (step 704). A determination is then made in response to the test as to whether the burst is a shortened burst or a normal burst (step 706). If the burst is a shortened burst, the process then subtracts the received power level from the nominal operating level (step 708). The signed difference is then sent to the CAU in a response message (step 710). The next slot is then processed (step 712) with the process then returning to step 700.

With reference again to step 706, if the burst is a normal burst, a test is then performed to determine whether the received power level is within the operating window (step 714). Thereafter, a determination is made as to whether the results of the test show that the received power level is within the operating window (step 716). If the power level is not within the operating window, the process then sends a series of increment or a decrement messages to the CAU (step 718) altering the CAU output power in 2 dB steps until the nominal power level is achieved. The process then continues to step 712 as previously described. With reference again to step 716, if the power level is within the operating window, the process also proceeds to step 712 to process the next slot without sending an adjustment message to the CAU.

Figure 8:
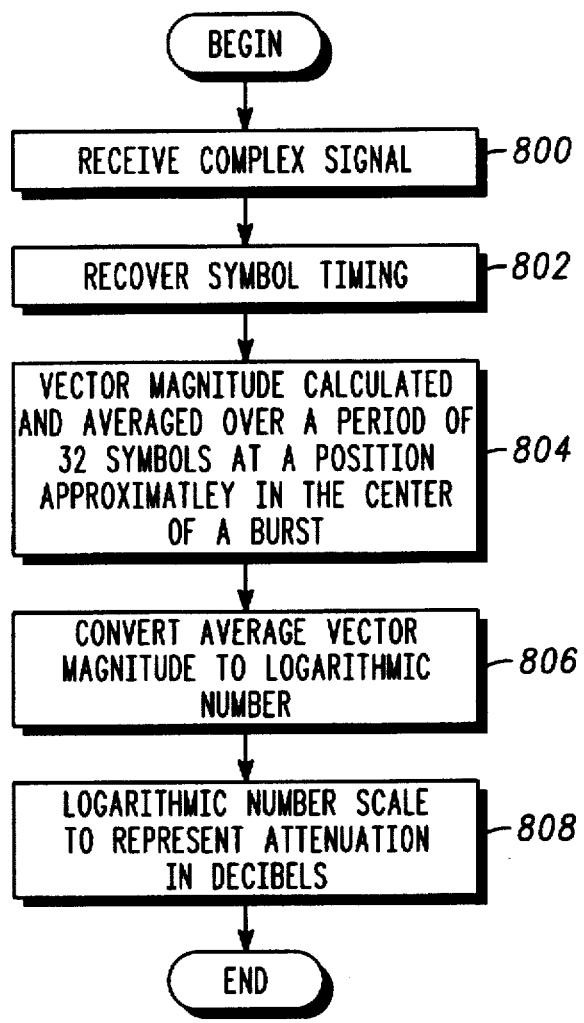
FIG. 8 is a flowchart of a process for obtaining a power attenuation level from a signal received at a cable control unit according to the present invention.

With reference now to FIG. 8, a flowchart of a process for obtaining a power attenuation level from a signal received at a CCU is depicted according to the present invention. This flowchart is a more detailed description of step 702 in FIG. 7. The process begins by receiving a complex digital signal from the A/D converters (step 800). Thereafter, symbol timing is recovered (step 802) and the vector magnitude of the complex signal is calculated (step 804). The vector magnitude is calculated using an approximation to:

$$|VEC| = \sqrt{I^2 + Q^2}$$

where the approximation is $|VEC|=0.3364*MIN(|I|,|Q|)+MAX(|I|,|Q|)$. The average vector magnitude, which is a linear 7-bit value, is converted to a logarithmic number using a lookup table procedure (step 806). The logarithmic number is scaled to represent the amount of attenuation in decibels relative to the maximum input of the A/D converter before clipping (step 808) with the process terminating thereafter.

Figure 9:
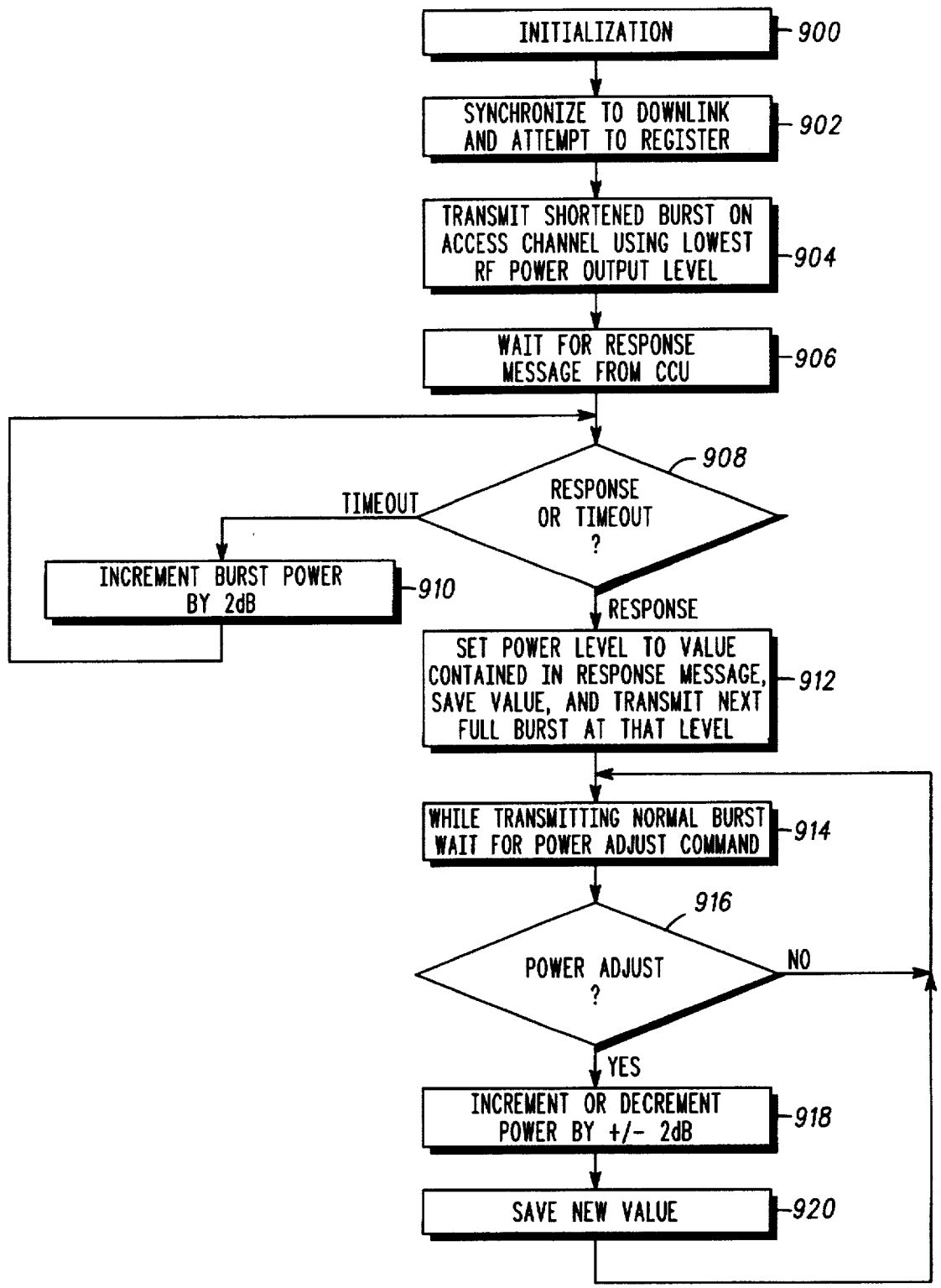
FIG. 9 is a flowchart of a process followed by the cable access unit for controlling the power level of data transmissions according to the present invention.

With reference now to FIG. 9, a flowchart of a process followed by the cable access unit for controlling the power level of data transmissions is depicted according to the present invention. The process begins by performing initialization of the CAU (step 900). Thereafter, the process synchronizes to the downlink and attempts to register with the cable communication system (step 902). A shortened burst is transmitted on the access channel using the lowest RF power output level (step 904). Thereafter, the process waits for a response message from the cable control unit (step 906). The process then determines whether a response or a timeout has occurred (step 908). If a timeout has occurred, the burst power level is incremented by 2 dB (step 910) with the process returning to step 908.

If the determination in step 908 is that a response has occurred, the process then sets power level to the value contained in the response message, saves the value, and transmits a normal burst at that power level (step 912). While transmitting normal burst, the process waits for a power adjust command (step 914). A determination is made as to whether a power adjustment is to occur (step 916). If no power adjustment is to occur, the process returns to step 914. Otherwise, the process increments or decrements the power by +/-2 dB (step 918). The new value is saved (step 920) with the process then returning to step 914.

Figure 10A:
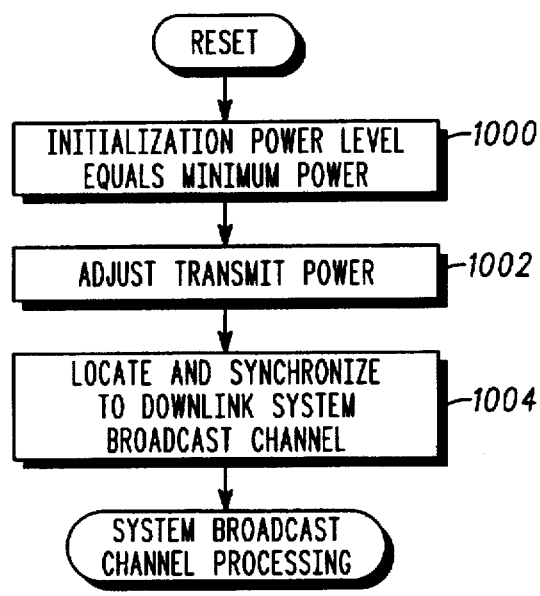
FIGS. 10A–10D are more detailed flowcharts for controlling the power level of data transmissions from a cable access unit according to the present invention.

Turning next to FIGS. 10A-10D, more detailed flowcharts for controlling the power level of data transmissions at a cable access unit are depicted according to the present invention. With reference now to FIG. 10A, in initialization, the power level is set equal to the minimum power level, MIN_POWER (step 1000). The transmit power is then adjusted based on the initialized power level (step 1002). Thereafter, the process locates and synchronizes to the downlink for the SBC (step 1004). The process continues in FIG. 10B in which SBC processing occurs first, in which a determination is made as to whether a near end link request has been made (step 1006). A near end link request is originated by a user at the CAU (for example, taking the phone off-hook to place a call). If the answer to this determination is yes, the process then tunes and synchronizes to the downlink SAC (step 1008). With reference again to step 1006, if a near link request has not been made, a determination is then made as to whether a far end link request has been made (step 1010). A far end link request is a request made by the cable control unit (for example, a call comes in whose destination is the respective CAU). If a far end link request has not been made, the process then returns to monitor the SBC in step 1006. Otherwise, the process proceeds to step 1008 as previously described.

Figure 10B:
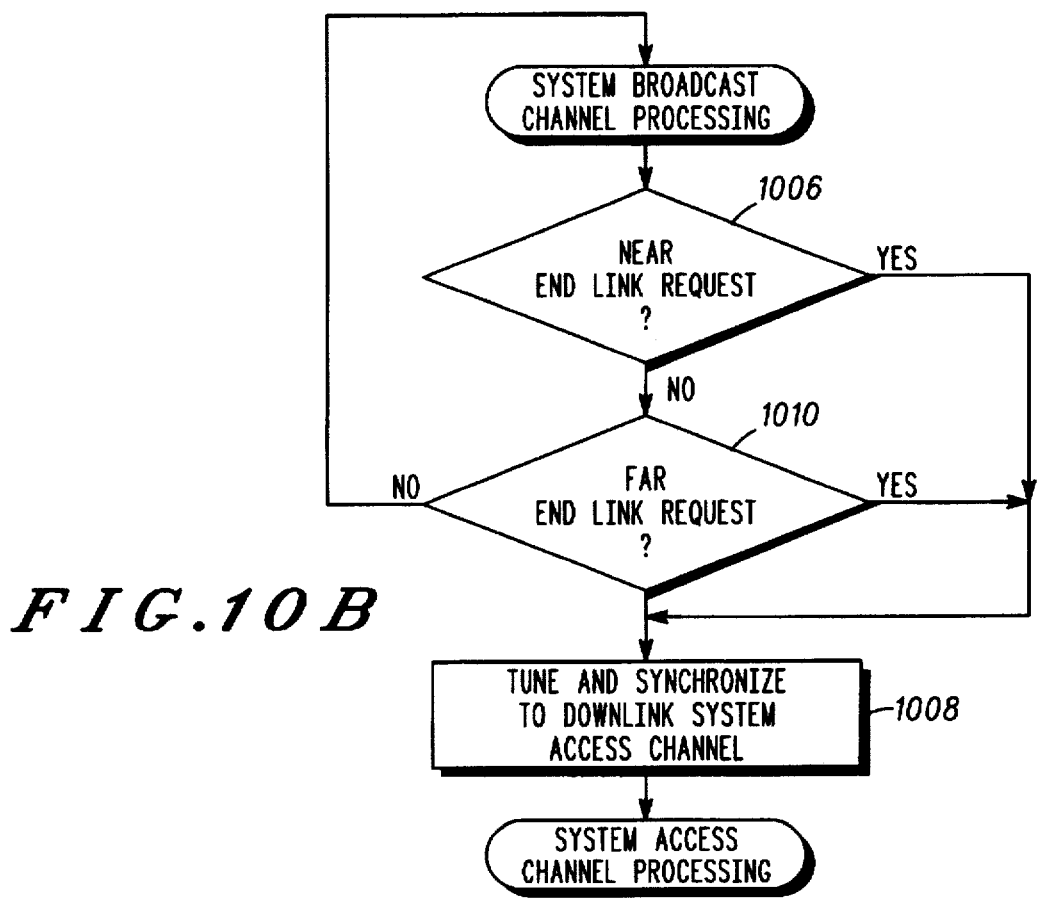
Figure 10C:
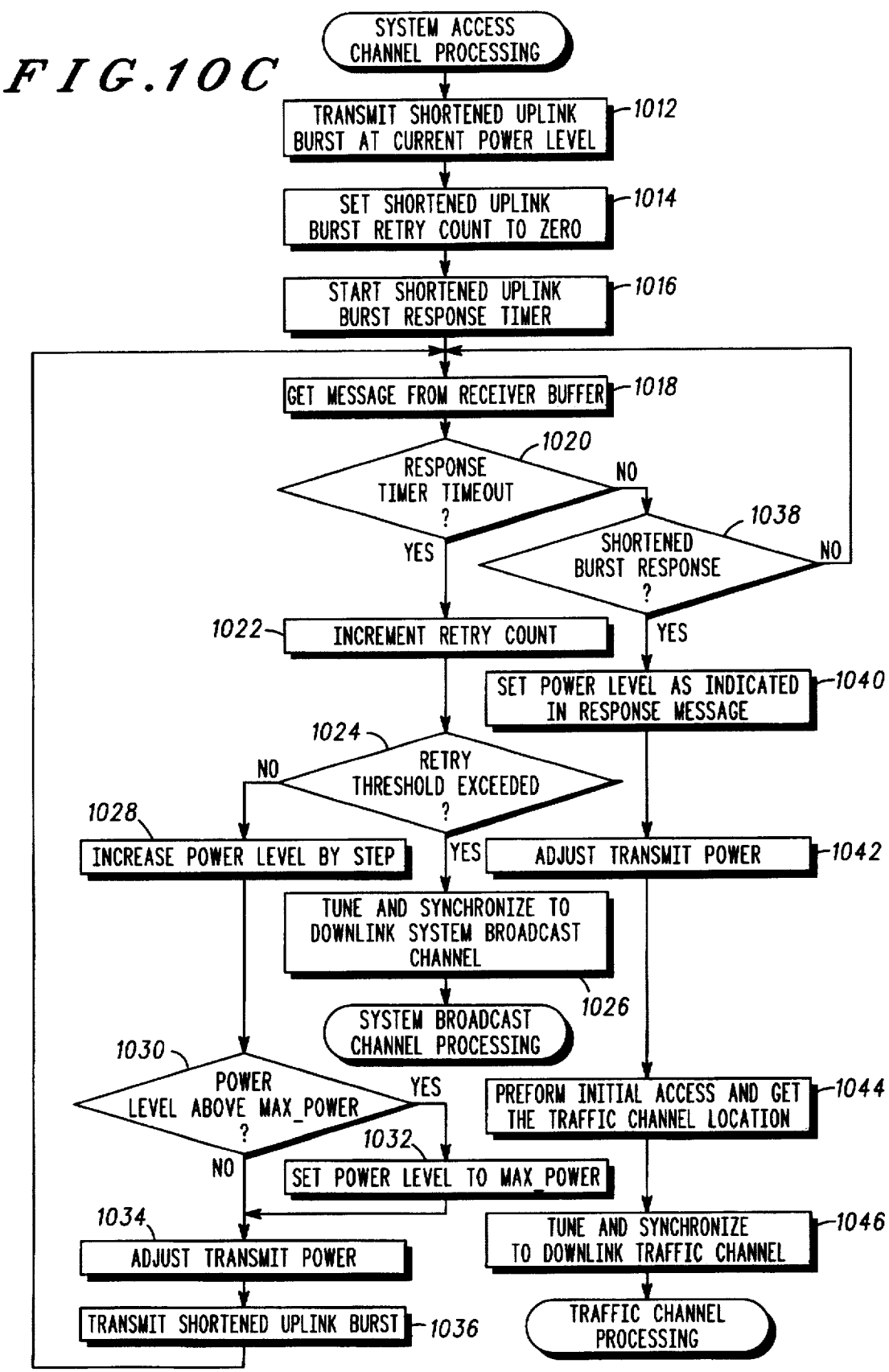

Thereafter, the process begins SAC processing as illustrated in FIG. 10C. A shortened uplink burst is transmitted at the current power level (step 1012). Next, a shortened uplink burst retry counter is set equal to zero (step 1014), and a shortened uplink burst response timer is started (step 1016). The process then obtains a message from the receive buffer (step 1018). In this step, the process continually checks for messages in the receive buffer for a response. A determination is then made as to whether a timeout has occurred in the response timer (step 1020). If a timeout has occurred, the retry count is incremented by one (step 1022).

Next, a determination is made as to whether the retry threshold has been exceeded by the retry count (step 1024). If the threshold has been exceeded, the process tunes and synchronizes to the downlink SBC (step 1026) and the process returns to SBC processing in FIG. 10B. With reference again step 1024, if the threshold has not been exceeded, the power level is increased by a value, STEP (step 1028). A determination is then made as to whether the power level is above the maximum power level, MAX_POWER (step 1030). If the maximum power level has been exceeded, the power level is then set to the minimum power level, MIN_POWER (step 1032). The process then adjusts the transmit power level (step 1034) based on the power level set in (step 1032). With reference again to step 1030, if the power level is not above the maximum power level, the power is adjusted in step 1034 based on the power level increase specified in step 1028. Thereafter, a shortened uplink burst is transmitted (step 1036) and the process returns to step 1018 as previously described.

With reference again to step 1020, if a timeout has not occurred, the process then determines whether a shortened burst response has occurred (step 1038). If a shortened burst response has not occurred, the process returns to step 1018. Otherwise, the power level is set as indicated in the response message (step 1040). Next, the transmit power is adjusted based on the power level set as indicated in the response message (step 1042). Initial access is performed and the TC location is obtained (step 1044). Thereafter, the process tunes and synchronizes to the downlink TC (step 1046).

Figure 10D:
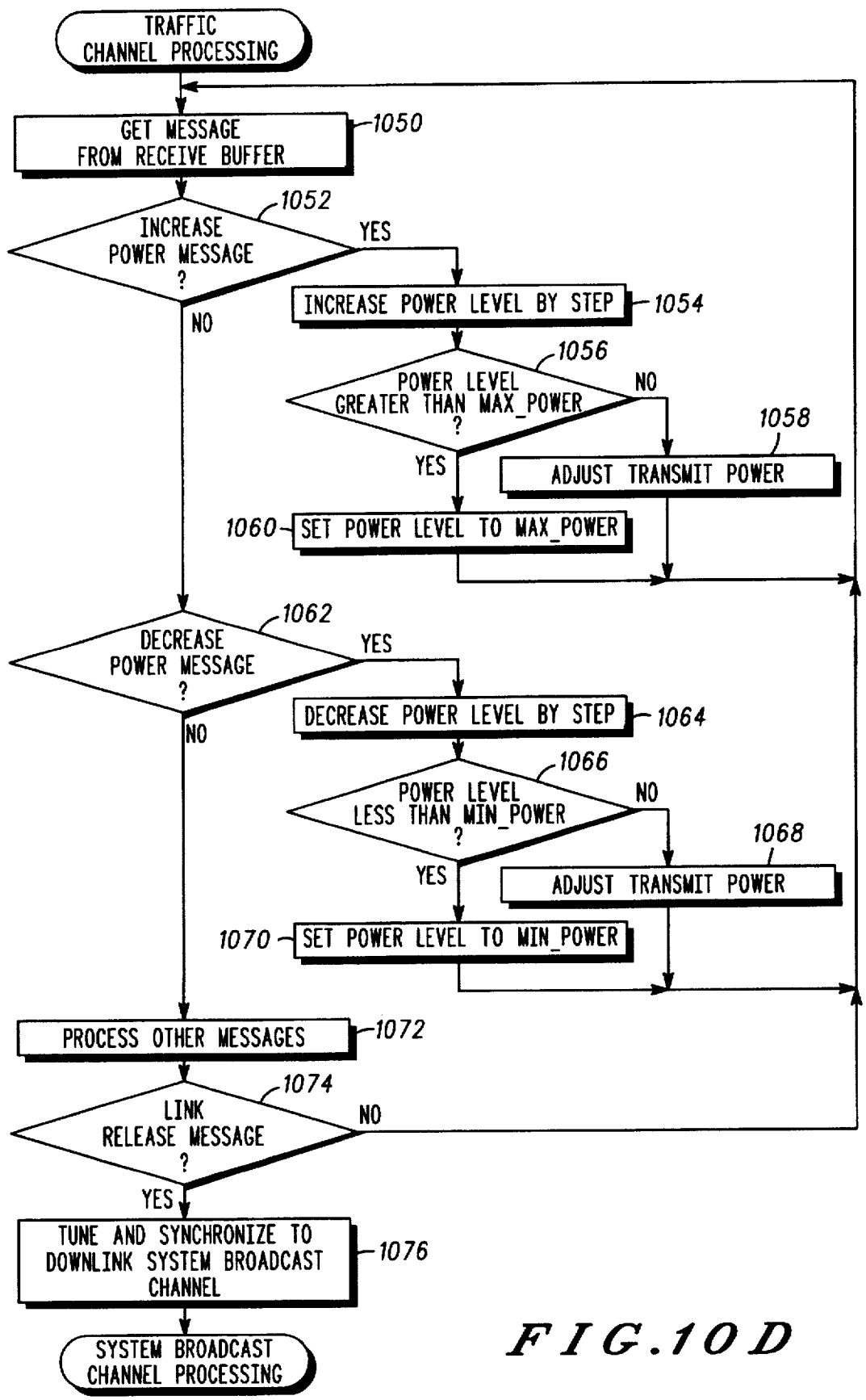

Next, the process begins TC processing as illustrated in FIG. 10D. A message from the receive buffer is obtained (step 1050). Then, a determination is made as to whether the message indicates that the power is to be increased (step 1052). If the power is to be increased, the power level is increased by a value, STEP (step 1054). Thereafter, a determination is made as to whether the power level is greater than the maximum power level, MAX_POWER (step 1056). If the power level is not greater than the maximum power level, the transmit power is adjusted as set forth in step 1054 (step 1058). Otherwise, the power level is set equal to the MAX_POWER (step 1060). In either case, the process then returns to step 1050. With reference again to step 1052, if the message is not an increase power message, the process then determines whether the message is a decrease power message (step 1062). If the message is a decrease power message, the power level is decreased by STEP (step 1064).

A determination is then made as to whether the power level is less than the minimum power level, MIN_POWER (step 1066). If the power level is not less than the minimum power level, the transmit power is adjusted by the value STEP (step 1068). Otherwise, the power level is set to the MIN_POWER (step 1070). In either case, the process then returns to step 1050. With reference again to step 1062, if the message is not a decreased power message, the process then processes the message (step 1072). Thereafter, a determination is made as to whether a link release message is present (step 1074). If a link release message is not present, the process returns to step 1050. Otherwise, the process tunes and synchronizes to the downlink SBC (step 1076) with the process then returning to SBC processing as depicted in FIG. 10B.

The processes depicted in FIGS. 6–10D may be implemented by those of ordinary skill in the art within the hardware illustrated in FIGS. 1–3 and 5. The processes of the present invention also may be implemented in a program storage device that is readable by processors within the hardware depicted above, wherein the program storage device encodes executable instructions for the processes of the present invention. The program storage device may take various forms including, for example, but not limited to a hard drive, an optical disk, a ROM, an EPROM, or a RAM, which are known to those skilled in the art.

The processes stored on a program storage device are dormant until activated by using the program storage device with a processor, such as a microprocessor or a DSP. For example, the processes for controlling the power level of transmissions from a CAU may be coded as instructions stored on a ROM. Connecting the ROM to the processor in the CAU allows for the processor to execute these instructions and control the power level data transmissions.

The present invention provides an improved communications system by allowing for adaptive power control of data transmissions from communications unit, such as CAUs. According to the present invention, the performance of CAUs throughout a communications system are maintained at acceptable levels by determining the power level of bursts received at a headend receiver, such as a cable control unit. The CCU determines whether a particular CAU is transmitting within an acceptable range of power levels. The CCU sends back messages to the CAU to adjust the power level of the CAU's transmissions to maintain the signal received by the CCU within a desired range. As a result, the methods and apparatus of the presently claimed invention provide for dynamic power control of transmissions from CAUs.

While the invention has been particularly shown and described with reference to a preferred embodiment, it will be understood by those skilled in the art that various changes in form and detail may be made therein without departing from the spirit and scope of the invention. For example, although the depicted example focuses on power control of transmissions from CAUs in a hybrid fiber coaxial cable system, the processes of the presently claimed invention may be implemented in other types of communication systems in which power levels of data transmissions between communications units within the communication system should be maintained within various operating ranges.

What is claimed is:

1. A method for controlling power levels of data transmissions between a remote communications unit and a central communications unit in a cable-based communications system, the method comprising:

initializing a power level for data transmissions from the remote communications unit to the central communications unit by sending an initialization transmission from the remote communications unit to the central communications unit and adjusting the power level in the remote communications unit to an initial power level indicated in an initial response from the central communications unit;

sending at the initial power level a data transmission from the remote communications unit to the central communications unit;

determining a subsequent power level of the data transmission at the central communications unit in response to receiving the data transmission at the initial power level from the remote communications unit;

sending a subsequent response to the remote communications unit in response to a determining that the power level of the data transmission is outside of a preselected range, the preselected range including a lower threshold and a nominal level set apart from and higher in power than the lower threshold; and adjusting a subsequent power level of a subsequent data transmission from the remote communications unit to substantially the nominal level.

2. The method of claim 1 wherein the initialization step further comprises:

sending a first initialization transmission from the remote communications unit to the central communications unit;

waiting for a response from the central communications unit for a period of time;

sending additional initialization transmissions to the central communications unit and waiting for a response from the central communications unit, each subsequent initialization transmission following a prior initialization transmission having a power level greater than the prior initialization transmission;

halting the sending of additional initialization transmissions in response to receiving a response from the central communications unit, wherein the response contains information indicative of the initial power level for subsequent data transmissions by the remote communications unit; and adjusting the power level of data transmissions to the central communications unit to the initial power level indicated by the response.

3. The method of claim 1, wherein the remote communications unit is coupled to the central communications unit by a cable distribution network supporting radio frequency communications and using time division multiplexing in which a communications frequency is divided by time into a plurality of time slots, and wherein the step of sending a data transmission comprises sending a burst in one of the plurality of time slots from the remote communications unit to the central communications unit.

4. A communications system comprising:

a cable-based communications network;

a first and a second communications unit connected to the communications network;

a plurality of initialization signals transmitted from the second communications unit to the first communications unit, the plurality of initialization signals including a first initialization signal having a first power level and additional initialization signals, each subsequent initialization transmission following a prior initialization transmission having a power level greater than the prior initialization transmission;

an adjustment signal, the adjustment signal transmitted from the first communications unit to the second communications unit in response to receiving an initialization signal of the plurality of initialization signals from the second communications unit having a power level outside of a desired range and in response to a first data transmission signal from the second communications unit having a power level outside of the desired range, the adjustment signal indicating an adjustment value required for an adjusted power level of transmissions from the second communications unit to be at substantially a nominal level, the nominal level being greater in power than a lower threshold of the desired range; and an adjusted data transmission signal transmitted by the second communications unit and adjusted in power compared to the first data transmission signal by the adjustment value indicated by the adjustment signal.

5. The communications system of claim 4, wherein the lower threshold is at least 20 decibels above a noise power level at the first communications unit.

6. The communications system of claim 5, wherein the desired range is about 7 decibels wide.

7. The communications system of claim 4, wherein the first communications unit comprises:

an interface to the communications network, the interface connecting the first communications unit to the communications network and receiving and transmitting data on the network; and a processing unit including a first processor detecting the power level of the first data transmission signal, a second processor determining whether the power level of the first data transmission signal is within the desired range, a third processor determining the adjustment value in response to a determination by the second processor that the power level is outside of the desired range, a fourth processor sending the adjustment signal to the second communications unit.

8. The communications system of claim 7, wherein the second communications unit comprises:

an interface to the communications network, the interface connecting the second communications unit to the communications network and receiving and transmitting data on the communications network;

an amplifier coupled to the interface, the power level of the first and the adjusted data transmission signals from the second communications unit being controlled by the amplifier; and a processing unit coupled to the amplifier and determining whether an adjustment signal has been received and controlling the amplifier in response to the adjustment signal.

9. The communications system of claim 4, wherein the adjusted data transmission signal includes voice data.

10. The communications system of claim 4, wherein the adjusted data transmission signal includes non-voice data.

11. The communications system of claim 4, wherein the communications system is a time division access and frequency division multiplexing communications system.

12. An apparatus for receiving and sending data transmissions to a communications unit in a radio frequency cable distribution system, the apparatus comprising:

an interface to the radio frequency cable distribution system, wherein the interface connects the apparatus to the communications network and receives and transmits data on the communications network, the interface having a receiver receiving an initialization transmission and a data transmission, both the initialization transmission and the data transmission in a form of a burst, the interface further having analog to digital converters for converting the burst into a complex digital signal; and a processing unit including a first processing means for determining a power level for a data transmission received from a communications unit, the first processor means having means for receiving a complex digital signal from the analog to digital converters and means for determining the power level of the burst from the received complex digital signal, a second processing means for determining whether the power level of the data transmission from the communications unit is within a range, a third processing means for determining an adjustment value in response to a determination by the second processing means that the power level is outside of the range, the adjustment value indicating a power difference necessary to adjust subsequent data transmissions received from the communications unit to substantially a nominal power level set apart from and higher than a lower threshold of the range, and a fourth processing means for sending the adjustment value to the communications unit originating the data transmission.

13. The apparatus of claim 12, wherein the processing unit comprises a microprocessor, a first digital signal processor, and a second digital signal processor, wherein the first processing means is located within the first digital signal processor, the second and third processor means are located within the microprocessor, and the fourth processing means is located within the second digital signal processor.

14. The apparatus of claim 12, wherein the processing unit is a microprocessor.

15. The apparatus of claim 12, wherein a positive adjustment value is sent to the communications unit in response to the power attenuation level of the data transmissions being greater than a lower threshold of the range.

16. The apparatus of claim 15, wherein the lower threshold is equal to 9 decibels.

17. The apparatus of claim 12, wherein a negative adjustment value is sent to the first communications unit in response to the power attenuation level of the data transmissions being less than an upper threshold of the range.

18. The apparatus of claim 17, wherein the upper threshold is equal to 2 decibels.

19. The apparatus of claim 12, wherein the adjustment value causes the communication unit to send data transmissions substantially at the nominal power level.

20. An apparatus for receiving and sending transmissions to a central communications unit coupled to a radio frequency cable distribution system, the apparatus comprising:
an interface coupled to the radio frequency cable distribution system;
an amplifier controlling a power level of initialization transmissions and of a plurality of data transmissions emanating from the apparatus;
a processing unit, coupled to and controlling the amplifier, the processing unit having first processing means for periodically sending initialization transmissions, wherein a first of the initialization transmissions has an initial power level and each subsequent initialization transmission has a power level greater than a power level of the prior initialization transmission; the processing unit further determining whether an adjustment value has been received by the apparatus, and in response to determining the adjustment value has been received, the processing unit further having a second processing means for terminating the periodic sending of initialization transmissions by the first processing means in response to receiving the adjustment value and adjusting via the amplifier the power level of at least one of the data transmissions to a nominal power level set apart from and higher in power than a lower threshold of a power range acceptable to the central communications unit.

21. The apparatus of claim 20, wherein the initialization transmissions are sent as respective shortened bursts.

22. The apparatus of claim 20, wherein the plurality of data transmissions are sent in respective time slots in the radio frequency cable distribution system.

23. The apparatus of claim 20, wherein the plurality of data transmissions are data sent as normal bursts within respective time slots.

24. A storage device readable by a processor in a communications unit and encoding processor executable instructions for controlling a power level of a plurality of data transmissions from the communications unit, the data storage device comprising:
instruction for periodically sending initialization transmissions, wherein a first of the initialization transmissions has an initial power level and each subsequent initialization transmission has a power level greater than a power level of the prior initialization transmission;
instruction for determining whether an adjustment value has been received by the communication unit;
instruction for terminating the periodic sending of initialization transmissions in response to receiving the adjustment value; and
instruction for adjusting, in response to receiving the adjustment value, a power level of at least one of the data transmissions to a nominal power level set apart from and higher in power than a lower threshold of a power range acceptable to a central communications unit receiving the at least one of the data transmissions, wherein an instruction means are activated when the storage device is connected to a processor.

25. The storage device of claim 24, wherein the storage device is a read only memory.

26. The storage device of claim 24, wherein the storage device is a random access memory.

27. An apparatus comprising:
a processing unit having at least four modes of operation including:
a first mode of operation in which the processing unit determines a power level for a data transmission and for an initialization transmission from a communications unit, both the initialization transmission and the data transmission in a form of a burst, the first mode of operation including determining a complex digital signal from the burst;
a second mode of operation in which the processing unit determines whether the power level of the complex digital signal is within an acceptable range;
a third mode of operation in which, in response to a determination in the second mode of operation that the power level is outside of the acceptable range, the processing unit determines an adjustment value necessary to adjust the power level of the data transmission to an nominal power level greater than and set apart from a lower threshold of the acceptable range; and
a fourth mode of operation in which the processing unit sends the adjustment value to the communications unit.

28. The apparatus of claim 27, wherein the processing unit comprises a microprocessor.

29. An apparatus for receiving and sending transmissions from a central communications unit in a radio frequency cable distribution system, the apparatus comprising:
an interface to the radio frequency cable distribution system, wherein the interface connects the apparatus to the radio frequency cable distribution system and provides a connection for receiving and transmitting data and transmitting initialization transmissions on the radio frequency cable distribution system;
an amplifier coupled to the interface, wherein a power level of initialization transmissions and of a plurality of data transmissions emanating from the apparatus is controlled by the amplifier, and wherein a first of the initialization transmissions has an initial power level and each subsequent initialization transmission has a power level greater than a power level of the prior initialization transmission;
a processor unit coupled to and controlling the amplifier, the processor having at least two modes of operation including:
a first mode of operation in which the processor unit determines whether an adjustment value has been received by the interface; and
a second mode of operation in which the processor unit, in response to determining the adjustment value has not been received, adjusts via the amplifier the power level of each subsequent initialization transmission, the processor unit, further in response to determining the adjustment value has been received in the first mode of operation, adjusts via the amplifier the power level of at least one of the plurality of data transmissions to an nominal power level greater than and set apart from a lower threshold of a power range acceptable to the central communications unit.

* * * * *